March 15, 1960  A. W. BEEMAN ET AL  2,928,301
POWER OPERATED SPINNING DEVICES FOR PIPE
Filed July 18, 1957  3 Sheets-Sheet 3
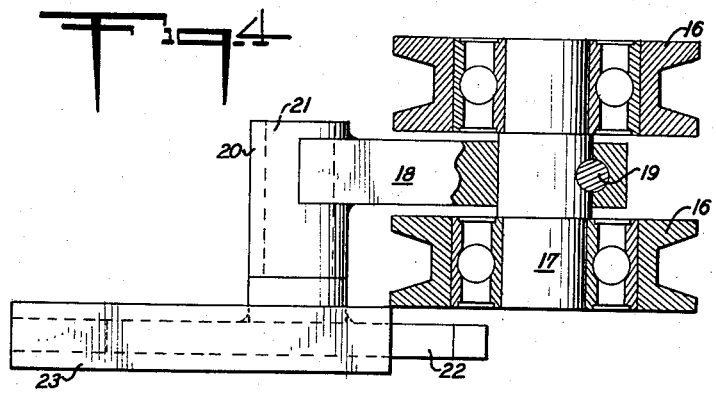
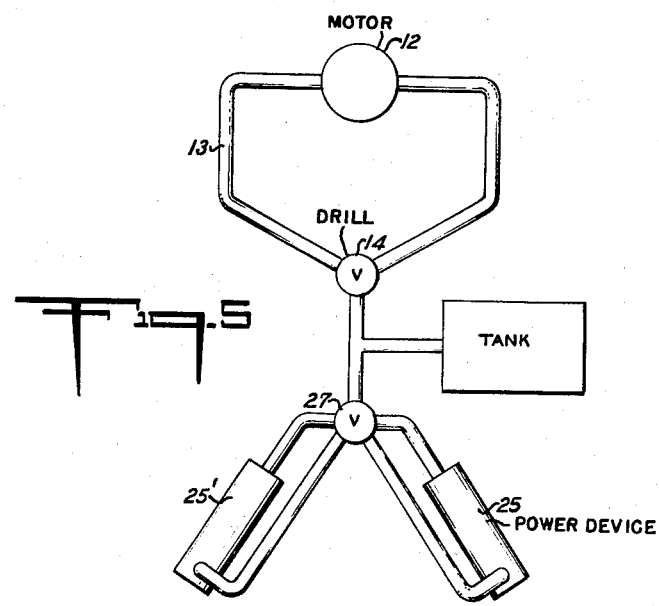
INVENTORS
ARCHIE W. BEEMAN
CLARENCE D. NEW
BY
ATTORNEYS _United States Patent Office_

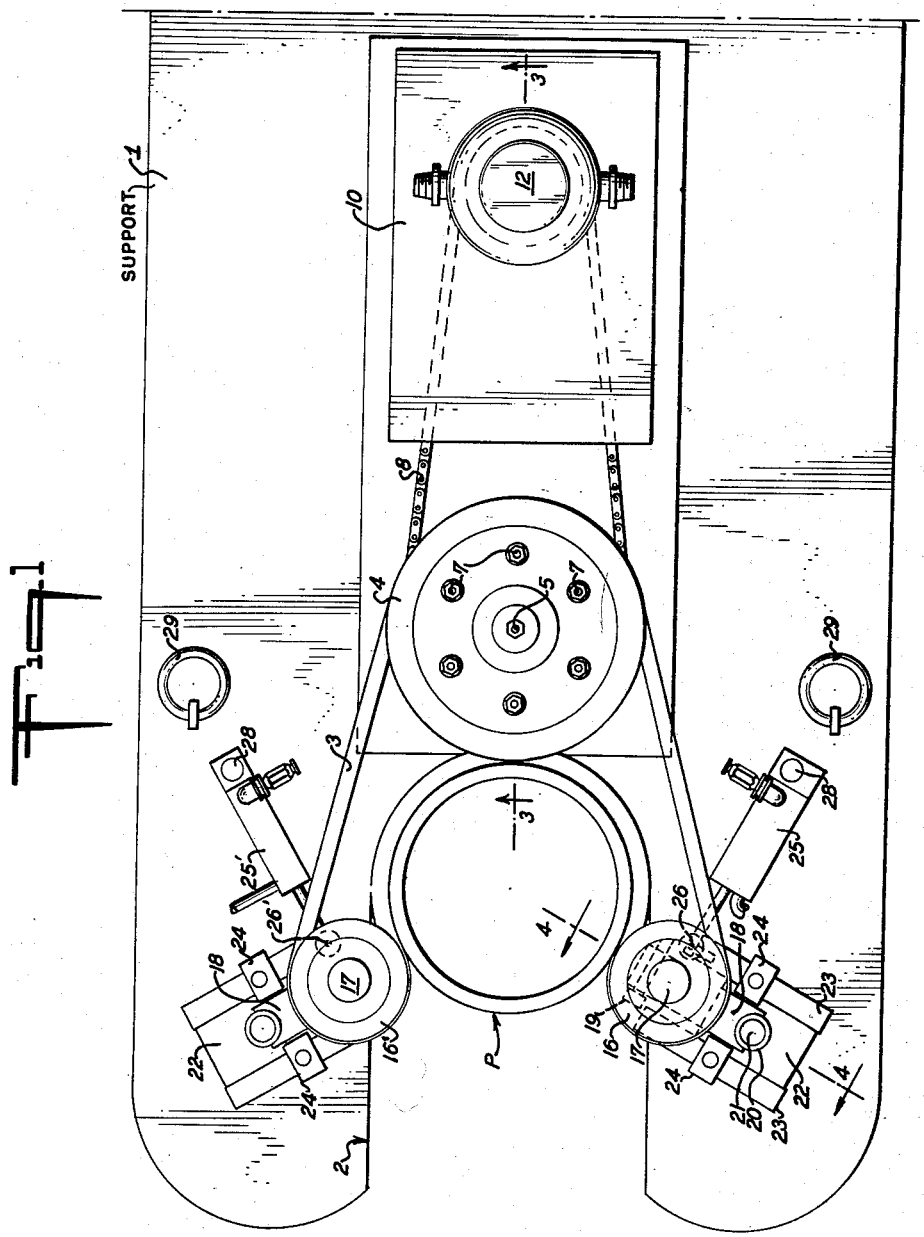

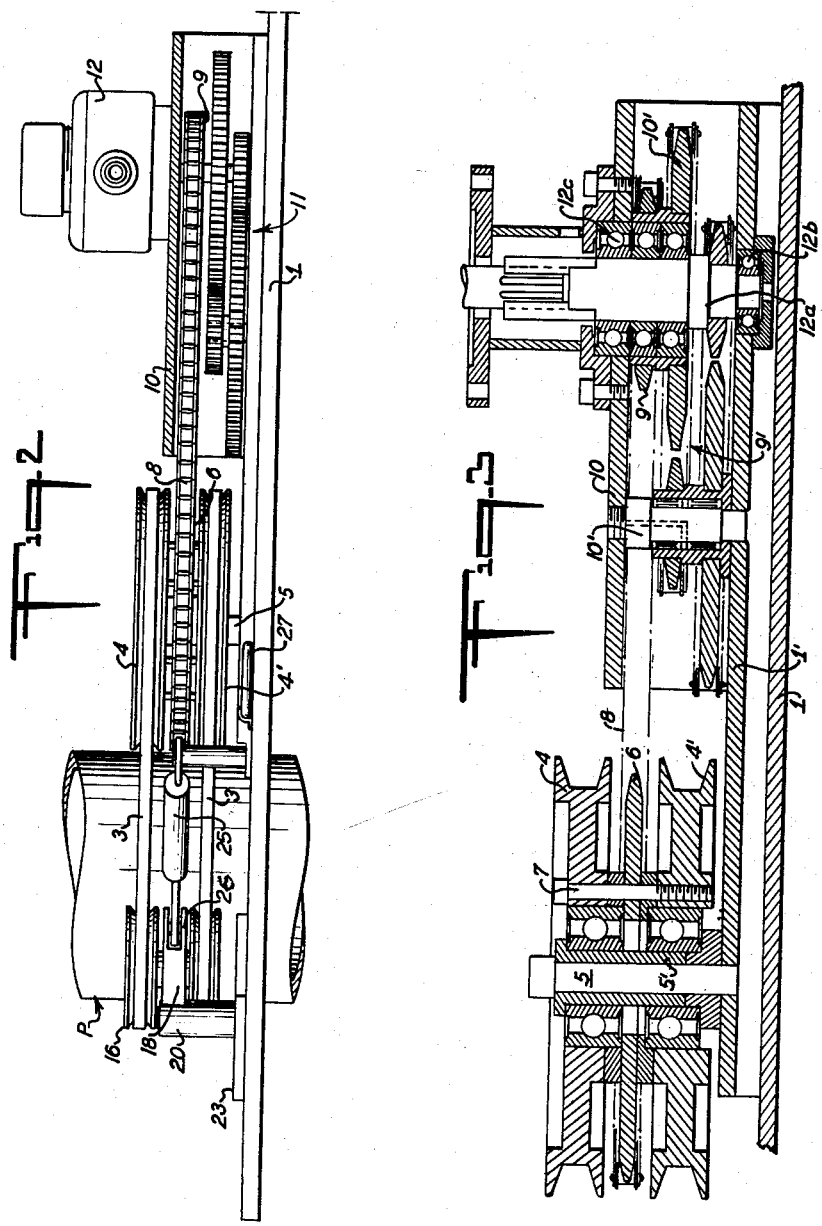

2,928,301
Patented Mar. 15, 1960

2,928,301

POWER OPERATED SPINNING DEVICES FOR PIPE

Archie W. Beeman and Clarence D. New, Odessa, Tex.

Application July 18, 1957, Serial No. 672,639

8 Claims. (Cl. 81—53)

This invention relates to improvements in spinning devices for pipe of the character used for screwing pipe sections together in making up casing, tubing, drill-pipe, or any other type of vertical threaded pipe that is being introduced into a well or otherwise used in upstanding positions.

It has been the practice heretofore to use a cat line for this purpose, to be operated by a cat head or winch device. Such actuation of the pipe creates a hazardous condition and many accidents have resulted therefrom. Furthermore, the operation is slow and laborious, even though the line is actuated by a high speed cat head.

Various attempts have been made heretofore to rotate pipe sections by belts and other power devices, but these have been unsatisfactory, have been slow and laborious, and, in many instances, have resulted in severe damage to the pipe.

One object of this invention is to overcome the foregoing objections and to provide for spinning the sections of pipe with the greatest available speed, without damage to the pipe and without any reasonable likelihood of injury to workmen adjacent thereto.

Another object of the invention is to improve the construction of devices used for spinning a section of pipe in making up the loose threads of the joints thereof, or in disconnecting the sections, to enable this device to impart rotary action to the pipe section, which will be effective for fast action of the section and may be used on many different sizes of pipes.

Still another object of the invention is to simplify and improve the construction of a spinning device for pipe, to enable such device to be manufactured inexpensively and at low cost, consistent with the effective operation thereof, and while providing secure connection with the pipe section and preferably its application to pipes of different sizes.

These objects may be accomplished, according to one embodiment of the invention, by providing a plurality of flexible devices having a loop therein for embracing a section of pipe, with power means connected therewith for operating the flexible devices. Belts are suitable for the purpose and have sufficient flexibility, resiliency and strength so as to accommodate themselves to different sized pipes and for effectively gripping the surfaces thereof to apply rotary motion thereto.

Provision is made for adjusting the loop portions of the belts to accommodate these to pipes of different sizes, and also to impart an effective grip to the pipe. Guides are provided at one or both opposite sides of the loop, mounted for bodily movement to vary the lateral expanse of the loop and for applying direct pressure against the pipe, preferably by the action of power devices which will be effective under control of the operator for actuating these guides.

This embodiment of the invention is illustrated in the accompanying drawings, in which:

Fig. 1 is a top plan view of the spinning device;
Fig. 2 is a side elevation thereof;
Fig. 3 is a longitudinal section therethrough on the line 3—3 in Fig. 1;
Fig. 4 is another detailed cross sertion, substantially on the line 4—4 in Fig. 1; and
Fig. 5 is a diagrammatic plan view of the hydraulic controls.

The invention is shown as applied to a section of drill pipe, generally indicated at P. In making up a drill pipe in a well, the multiple sections are interconnected through tool joints at adjacent ends thereof with screw threaded connections that require bodily rotating one section of pipe with respect to another as the pipe sections, respectively, are suspended above and in the well. This spinning device is adapted for rotating the top section to cause it to interengage by screw threaded connection with the section of pipe in the well.

According to this embodiment of the invention, a suitable support is provided, generally designated by the numeral 1. This support 1 may be in the form of a flat plate, housing or other suitable construction, and additional enclosure means may be provided, if desired, which has been omitted from the drawings for clearness of illustration. The support 1 is provided with a throat 2 at one end thereof, to receive therein the section of drill pipe P, so as to enable the spinning device to act thereon, as hereinafter described.

The spinning device comprises a plurality of V-belts 3, in this embodiment. The belts 3 extend over drive sheaves 4 and 4', spaced apart vertically, as shown in Figs. 2 and 3. The sheaves 4 and 4' are coaxially mounted on a journal sleeve 5' journaled upon a spindle 5. The spindle 5 has the lower end thereof detachably screw threaded into a step-plate 1' mounted on the support 1.

The sheaves 4 and 4' are adapted to be power driven, and accordingly they are connected securely to a drive sprocket 6 interposed therebetween and secured to the sheaves as by means of bolts 7 extending therethrough, projecting loosely through the sheave 4 and sprocket 6 and threaded into the sheave 4'. Any other suitable means may be used for this purpose, as, for example, the sheaves and sprocket may be keyed securely to the same mounting shaft, but the sheaves should be detachable for separation and removal readily, as, for replacement of the belts 3.

The sprocket 6 is shown as power driven, as, for example, by a sprocket chain 8 extending from the sprocket 6 to a sprocket wheel 9 beneath a cover plate 10 mounted on the step-plate 1'. Enclosed by the cover plate 10 is speed-reducing gearing generally indicated at 11, operatively driven by a motor 12 mounted on the cover plate 10.

The speed-reducing gearing may be in the form of spur or sprocket gearing from a motor driven shaft 12a journaled in bearings 12b and 12c mounted in the step-plate 1' and the cover plate 10, respectively. The shaft 12a drives reducing gearing on a stub shaft 10' also mounted in the step-plate 1' and the cover plate 10, as generally indicated at 9' in Fig. 3, thence to the driving sprocket 9 that is journaled on the shaft 12a.

While any suitable drive motor may be used for the purpose, according to power sources available and the amount of power required, we have shown and prefer to use a hydraulic motor, because a source of hydraulic pressure is usually available at oil wells. The hydraulic system for the motor 12 is shown generally in Fig. 5 and designated by the numeral 13. A control valve is shown at 14. This is preferably a multi-way control valve, such as a 4-way valve, to provide for the operation of the motor 12 in opposite directions.

The belts 3 also extend over pairs of sheaves 16 and 16' located substantially at opposite sides of the throat 2. These are free sheaves, capable of independent turning movement, one for each belt 3 that is provided. As noted above, any suitable number of belts may be used as considered necessary, and likewise the number of sheaves employed may be varied as needed.

In the embodiment shown, each pair of sheaves 16 and 16' is journaled on a support shaft 17 (Fig. 4) which extends transversely through an arm 18, adjacent one end of the arm. The last-mentioned end of the arm may be split, if desired, with a fastening bolt 19 extending therethrough for clamping said end of the arm to the support shaft 17.

The opposite end of the arm 18 is provided with a sleeve 20 rigid therewith, and may be secured thereto as by welding or in other suitable manner. The sleeve 20 is telescoped loosely over a pin 21 upstanding from a slide member 22. The slide member 22 is received in a guideway between a pair of guides 23 mounted on the support 1, and is retained in place thereon by clamps 24. The guideway 23 extends radially of the axis of the pipe P.

In this way, the slide member 22 can be moved in and out, toward and from the axis of the pipe P in the throat 2. This may be a free sliding movement, if desired, or an adjustable movement, after which the slide member may be locked in place by the clamps 24. The arm 18 is free to swing on the axis of the pin 21, transversely tangent to a circle concentric with the axis of the pipe P, thereby bodily moving the sheaves 16 or 16' either toward or from the center of the axis of the pipe or around a circle subscribed therearound.

This adjusting movement is accomplished preferably by power devices, one of which is shown for each guide device on the respective opposite sides of the throat 2. The power devices are shown at 25 and 25', and may be in the form of hydraulic cylinders, the pistons of which are connected at 26 and 26', with arms 18, being pivoted thereto, accomplishing the result of turning about the axes of the pins 21, as described.

The power devices 25 and 25' are of the double-acting type for moving the sheaves 16 bodily in both directions. The power device 25' may be of smaller pressure area. Each of the power devices should be pivotally supported on the support 1, as indicated at 28.

The power devices 25 and 25' on opposite sides of the throat 2 may be operated separately or together, so as to move the belts 3 in and out relative to the pipe. Accordingly, we have provided hydraulic connections (see Fig. 5) with the power devices 25 and 25' under control of a valve 27 in the hydraulic system, which will accomplish these respective movements under control of the operator.

In the operation of the spinning device, it is applied to a pipe section substantially as indicated in Figs. 1 and 2. The belt or belts 3 are sufficiently long with respect to the guide path provided by the sheaves 4, 4' and 16, 16', so that a loop will be formed in one side of the belts in embracing relation with the pipe section P, to apply a bite thereto, as will be apparent from Fig. 1. The sheaves 16 are forced inward by the adjustment provided by the slide members 22 and by the swinging motion imparted to the arms 18 by the hydraulic power device 25, either with or without operation of the device 25', so as to stretch the belts around the pipe section P in a tight grip thereon. This forms a friction grip on the pipe sufficient for rotating movement thereto by embracing action of the belts.

Then, upon operation of the motor 12 in either direction, corresponding movement is applied to the drive sprocket 9 and the driving sheaves 4 and 4' for operating the belts 3. The speed of operation thereof may be varied according to the power source and the degree of opening of the valve 14.

The gripping device may be applied to and removed readily from the pipe section P by the action of the hydraulic power device 25 or 25', or both. Thus, it is a simple matter to move the gripping device into and out of its operating position and to actuate the pipe section thereby.

The gripping device may be suspended in any suitable manner. We have shown support rings 29 that may be attached to opposite ends of the support 1 for connection of a sling, tripod or other suitable support means therewith for suspending the spinning device over the well.

The belts 3 can be replaced readily, when necessary, due to wearing or otherwise. This may be done by removing the spindle 5, which enables the entire sheave assembly to be lifted off the step-plate 1'. The uppermost belt 3 can be separated readily from the sheave 4, and after thus raising the sheave assembly, the lower belt can be detached from the sheave 4' and another belt replaced thereon. Then, the sheave assembly can be replaced on the step-plate 1' and fastened in place by engagement of the spindle 5. It is not necessary to separate or detach the sprocket 6 for this purpose.

The construction is extremely simple and inexpensive to build and to use, and is sufficiently light in weight that it may be made as a part of power tongs, or used adjacent thereto. Nevertheless, it is strong and effective for the purpose and will provide effective means to grip a joint of pipe to rotate the pipe in making up the joint or disconnecting it therefrom. Not only does the device provide an effective gripping of the pipe, but in like manner it may be accommodated to pipes of different sizes.

The invention has been described in connection with drill pipe. However, it is recognized that it may be used also in many other applications, such as casing, tubing and other types of vertical threaded pipe.

While the invention has been illustrated and described in one embodiment, it is recognized that variations and changes may be made therein, without departing from the invention, as set forth in the claims.

We claim:

1. A spinning device for a pipe comprising a support having a throat therein adapted to receive a pipe, a pair of arms extending inwardly toward said throat on opposite sides thereof, a stub shaft extending through one end of each arm, sheaves mounted on each stub shaft on opposite sides of each arm, a pin mounted on the support adjacent the other end of each arm, means pivotally connecting each arm on the adjacent pin, endless belts extending over the sheaves and each having a loop therein for embracing the pipe, a pair of drive sheaves connected with the belts, a spindle having the drive sheaves journaled thereon, a driving member mounted on the supporting shaft intermediate the drive sheaves, and means forming a detachable driving connection from said driving member to the respective drive sheaves.

2. A spinning device for a pipe comprising a support, a pair of arms pivotally mounted on the support in positions to straddle a pipe, means for swinging said arms about their pivots, endless belts engageable with the pipe for rotating the latter, idler sheaves mounted on the inner ends of the arms about which the belts pass, driving sheaves connected with the belts, a supporting shaft having the drive sheaves journaled thereon, a driving member mounted on the supporting shaft intermediate the drive sheaves, and means forming a detachable driving connection from the driving member to the respective drive sheaves.

3. A spinning device for a pipe comprising a support, a plurality of belts adapted for frictional engagement with a pipe, means for applying the belts in embracing relation with the pipe, and driving means for the belts, said driving means comprising a plurality of sheaves receiving the belts thereon, a driving member intermediate the sheaves coaxially thereof, a spindle mounted on the support and detachable therefrom, means journaling the sheaves and driving member on the spindle and a detachable connection between the driving member and associated sheaves for detachment and separation from each other.

4. A spinning device for a pipe comprising a support, a plurality of belts adapted for frictional engagement with the pipe, means for applying the belts in embracing relation with the pipe, and driving means for the belts, said driving means comprising a plurality of sheaves receiving the belts thereon, a driving member intermediate the sheaves coaxially thereof, a spindle mounted on the support and detachable therefrom, means journaling the sheaves and driving member on the spindle, said sheaves and driving member being bodily detachable from the support upon removal of the spindle, and a plurality of fastenings connecting the sheaves and driving member together for detachment and separation from each other.

5. A spinning device for a pipe comprising a support, a pair of arms on the support adapted to extend radially of the pipe on opposite sides thereof and normal to the axis thereof, means pivotally connecting said arms to the support, means slidably mounting said pivot means to move radially of said pipe, an endless belt having a loop therein for embracing the pipe to rotate the latter, means supporting said belt including an idler sheave mounted on each said arm, and means for driving the belt.

6. A spinning device for a pipe comprising a support, a pair of arms on the support adapted to extend radially of the pipe on opposite sides thereof and normal to the axis thereof, means pivotally connecting said arms to the support, means slidably mounting said pivot means to move radially of said pipe, an endless belt having a loop therein for embracing the pipe to rotate the latter, means supporting said belt including an idler sheave mounted on each said arm, and means for driving the belt, said last-named means comprising a drive sheave connected with the belt, a power motor, and speed reducing means operatively connecting the motor with the drive sheave.

7. A spinning device for a pipe comprising a support, a pair of arms connected to the support adapted to extend radially of the pipe on opposite sides thereof and normal to the axis thereof, said arm connecting means comprising slide members shiftably mounted on the support to move radially of the pipe, a pin mounted on each of said slide members, means pivotally connecting one end of each of said arms on its respective pin, a stub shaft extending through the other end of each of said arms, sheaves mounted on each of said stub shafts on opposite sides of said arm, endless belts having loops therein for embracing the pipe to rotate the latter, means supporting said belts including said sheaves, and means for driving the belts.

8. A spinning device for a pipe comprising a support, a pair of arms on the support adapted to extend radially of the pipe on opposite sides thereof and normal to the axis thereof, means pivotally connecting said arms to the support, means slidably mounting said pivot means to move radially of said pipe, an endless belt having a loop therein for embracing the pipe to rotate the latter, means supporting said belt including an idler sheave on each of said arms, means for driving the belt, and a power device for each arm pivotally connected at one end with the support and at the opposite end with said arm for tensioning and slackening the belt with respect to the pipe.

References Cited in the file of this patent

UNITED STATES PATENTS

| | | |
|---|---|---|
| 2,450,934 | Calhoun | Oct. 12, 1948 |
| 2,523,159 | Stone | Sept. 19, 1950 |
| 2,544,639 | Calhoun | Mar. 13, 1951 |
| 2,615,681 | True | Oct. 28, 1952 |
| 2,741,460 | Gardner | Apr. 10, 1956 |
| 2,746,329 | Paget | May 22, 1956 |
| 2,784,626 | Paget | Mar. 12, 1957 |

FOREIGN PATENTS

| | | |
|---|---|---|
| 650,574 | Great Britain | Feb. 28, 1951 |